June 29, 1943.  C. C. CRISTADORO  2,322,790
LOW DRAFT TRANSPORT VESSEL
Filed March 20, 1942  2 Sheets-Sheet 1

CHARLES C. CRISTADORO,
INVENTOR.

BY

ATTORNEY.

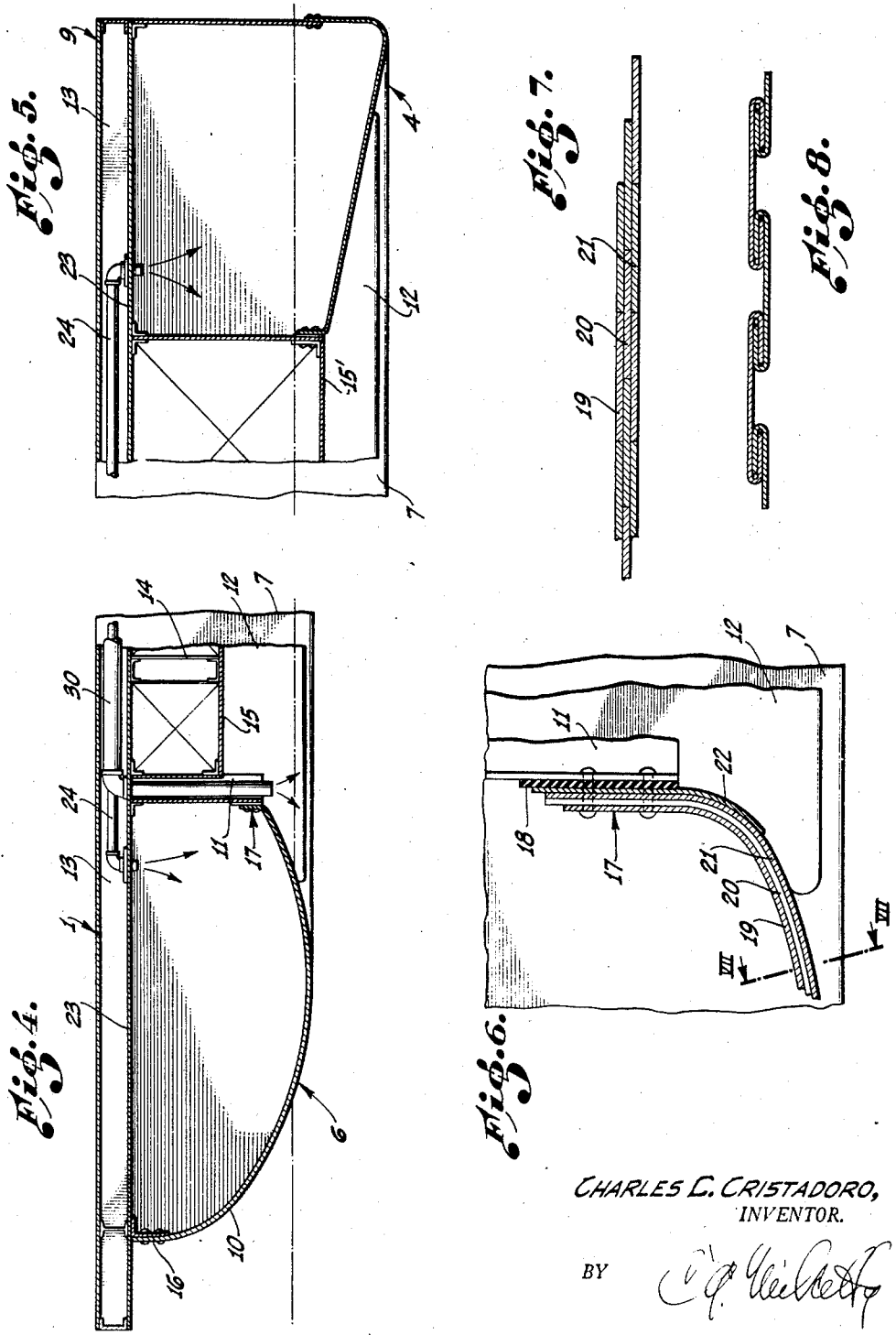

Patented June 29, 1943

2,322,790

UNITED STATES PATENT OFFICE 2,322,790

LOW DRAFT TRANSPORT VESSEL

Charles C. Cristadoro, Venice, Calif.

Application March 20, 1942, Serial No. 435,459

10 Claims. (Cl. 114—67)

This invention pertains to a transport vessel adapted for use on bodies of water, rivers, lakes and the like. The invention is particularly directed to a vessel in which the area of the hull in contact with the water is reduced to a very small proportion of the area which a normal ship of equal load-carrying capacity would have. The transport of the present invention employs a body of air at a superatmospheric pressure between the hull and the surface of the water, this permitting greater efficiency in the utilization of power so that higher speeds may be attained. Moreover, the invention contemplates the use of air screws as motive power, this form of propulsion, in combination with the pneumatic lift, resulting in high increases in the efficiency with which the transport may be driven.

Naval architects have recognized for many years that an excessively large amount of the power generated by any ship was absorbed in frictional resistance between the ship and the water and many expedients have been suggested in an attempt to reduce this friction, such as plating, the use of antifouling paints, the use of welded and polished surfaces, streamlining, etc. I have discovered that these expedients are unnecessary and ineffective, and instead of attempting to change the character of the surface in contact with the water, I have discovered means and methods whereby the total area in contact with water may be greatly reduced without reducing the load-carrying capacity of a vessel.

The present invention is also directed to a construction and arrangement of elements whereby a transport vessel of unique design is produced, such vessel moving upon a load-absorbing body or bodies of air at superatmospheric pressure so that but a minimum area of the vessel is in contact with the water.

The present invention also contemplates the use of air screw means instead of ordinary propellers immersed in the water, the vessels of my invention permitting the use of air screws with concomitant increase in speed and efficiency.

Generally stated, the pneumatic transports of my invention comprise a hull deck portion provided with a plurality of downwardly extending rails which are adapted to extend to or below the surface of the body of water over which the transport is to sail. The vessel of my invention is preferably provided with a yieldable bow portion, such bow portion including a downwardly and rearwardly extending lower surface so as to present a bow which is substantially transverse to the longitudinal axis of the vessel. It is also provided with a stern, which in combination with the longitudinally extending rails and bow, form one or more compartments or spaces beneath the hull deck. These spaces are filled, in part at least, with air superatmospheric pressure, the pressure carried in such spaces varying within limits in accordance with the load carried by the vessel. Air screw means are carried by the stern portion of the vessel and it has been found that high speeds may be attained with the expenditure of but relatively small quantities of power.

It is an object of the present invention, therefore, to disclose and provide a novel mode of construction of water-borne transport whereby relatively small surface areas of the transport are in contact with the water.

An object of the invention is to provide a water-borne transport particularly adapted for use in shallow waters, and which does not set up a heavy bow wave or wake which may be destructive to river banks or the like.

A further object of the present invention is to disclose and provide a construction for water-borne transport in which the major proportion of the load is carried by an area or areas of air at superatmospheric pressure and is not dependent upon actual displacement of the water.

A further object of the invention is to disclose and provide a construction of water-borne transport which results in greatly reduced skin friction and permits more effective utilization of power.

A still further object of the invention is to disclose and provide a pneumatic transport adapted for use as a cargo carrier, aircraft carrier or for the transport of passengers or troops in coastal waters, rivers and lakes.

These and other objects and advantages of the present invention will become apparent to those skilled in the art from the following detailed description of an exemplary form of the present invention. Although reference will be had to the appended drawings in order to facilitate understanding, it is to be understood that such drawings are partly diagrammatic and the invention is not limited to the specific forms there shown.

In the appended drawings:

Fig. 4 is an enlarged longitudinal section of the bow portion, the section being taken along the plane IV—IV of Fig. 2.

Fig. 5 is an enlarged longitudinal section taken along the plane V—V of Fig. 2.

Fig. 6 is a portion of the longitudinal section shown in Fig. 4, enlarged.

Fig. 7 is a transverse section taken along the plane VIII—VIII of Fig. 6.

Fig. 8 is a similar transverse section showing a modified construction.

Figure 1:
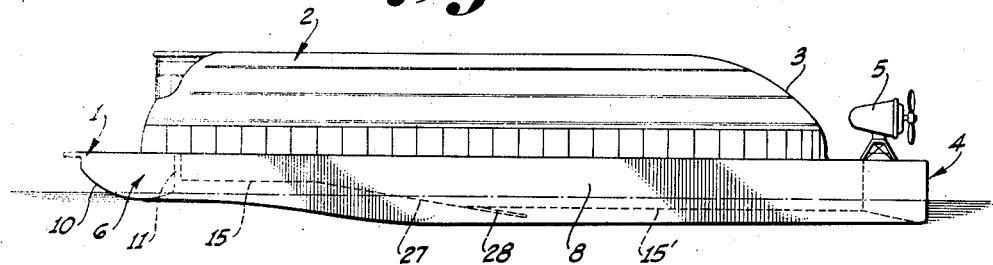
Fig. 1 is a side elevation of a pneumatic transport embodying the present invention.
Figure 2:
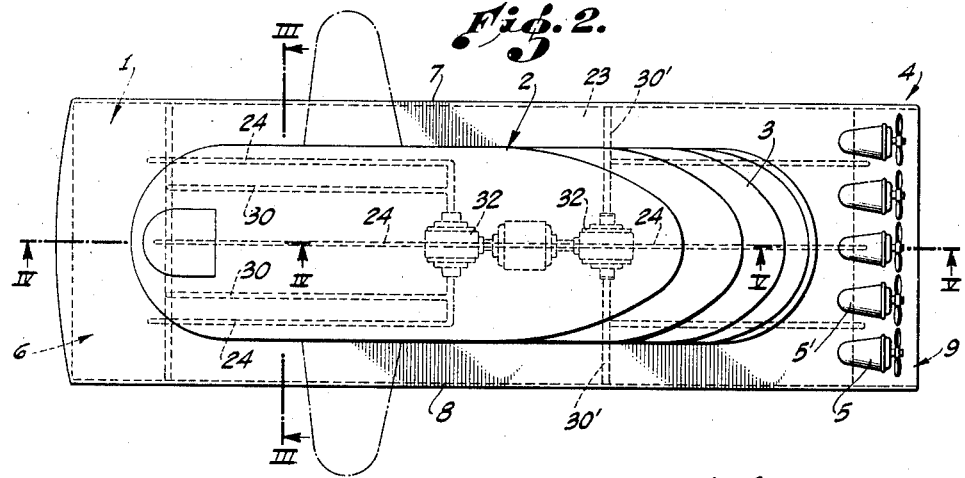
Fig. 2 is a plan thereof.
Figure 3:
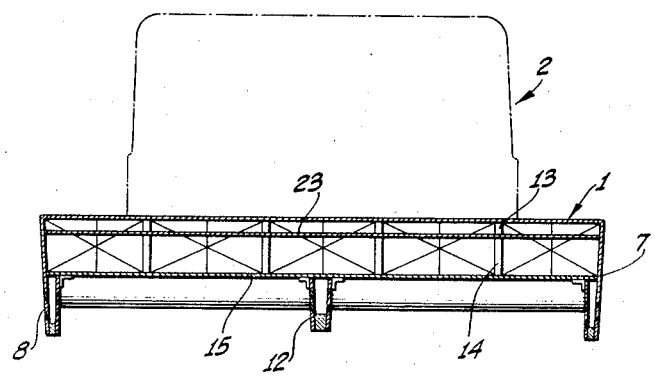
Fig. 3 is a transverse section taken along the plane III—III of Fig. 2.

By referring to Figs. 1, 2 and 3, it will be noted that the pneumatic transport there illustrated comprises a hull deck portion, generally indicated at 1, provided with a suitable superstructure 2 which is preferably flat-topped for the greatest portion of its length, the aft portion of the superstructure being streamlined or curved, as indicated at 3, towards the stern 4. Air screw means are carried by the stern portion of the hull deck 1, such air screw means comprising the motor means 5, 5', etc. with associated propellers.

From Fig. 2 it is evident that the pneumatic transport is of rectangular plan and although the proportions of length to beam may be varied within wide limits, I have discovered that the ratio of length to beam need not exceed 3:1 and that a ratio of approximately 2:1 is suitable, it being desirable that a large surface area be imported to the hull deck 1. In the drawings a relationship of approximately 3:1 has been maintained between length and beam. It is also to be noted that the bow is not pointed but instead the bow portion, generally indicated at 6, has a leading or forward edge substantially transverse to the longitudinal axis of the transport.

The structural details of the hull deck need not be described herein since construction will depend upon the size of the transport, loads to be carried thereby and use to which it is to be put. In all instances, however, the hull deck 1 includes side rail portions, generally indicated at 7 and 8, these side rail portions extending downwardly and longitudinally of the hull deck.

A stern is provided, the stern portion 9 extending downwardly substantially to the level of the lower edges of the side rails 7 and 8. The bow portion 6 is provided with a downwardly and rearwardly curved surface 10 extending from the top level of the hull deck 1 substantially to the level of the lower edges of the side rails and to the lower edge of a transverse bulkhead, generally indicated at 11. One or more longitudinal rails may be provided between the side rails 7 and 8 and in the example illustrated, a center rail 12 has been shown.

As shown in greater detail in Figs. 3 and 4, the hull deck 1 may be constructed of suitably connected, longitudinally extending beams 13 supported by transverse, built up, girders or trusses 14 to which the lower plating 15 is attached, this plating 15 being appreciably above the level of the lower edges of the side rails, such as the side rail 7. The transverse bulkhead 11 may extend below the level of the bottom plating 15 but terminate above the level of the lower edges of the side rails 7 and 8 and intermediate the center rail 12. The downwardly and rearwardly curved surface portion 10 of the bow 6 is preferably resiliently yieldable and water tight and may comprise a sheet or sheets of flexible material connected at their upper ends to the hull deck as, for example, at 16, and to the lower portion of the transverse bulkhead 11 as at 17. Fig. 6 is an enlarged view of the connection 17 and it will there be seen that the transverse bulkhead 11 includes a forward plating 18 whereas the downwardly and rearwardly curved portion 10 of the bow comprises a plurality of flexible metal sheets 19, 20 and 21 in overlapping and adjoining relation, these sheets being connected to the bulkhead 11 by suitable bolts or rivets, an intervening backing plate 22 having been provided between the assemblage of flexible sheets or strips and the plating 18. If desired, a continuous water-tight and substantially air-tight flexible sheet material, such as rubberized canvas composition or the like, may line the entire internal surface of the bow portion 6. The adjacent and overlapping relation of the strips 19, 20 and 21 is illustrated in Fig. 7 which is a transverse section along VII—VII of Fig. 6. A modified method of connecting the flexible strips at their edges is shown in Fig. 8, which shows the strips provided with bent, interlocking edge portions, these interlocking areas being filled or painted with a non-hardening, elastic packing or paint.

The beams 13 throughout the area extending above the bow portion 6 may be provided with a plating 23 which is substantially air tight, so that suitable air pressure may be maintained in the bow portion. Conduit means may be provided for supplying air at superatmospheric pressure to the space confined within the bow portion 6 and such conduit means are indicated at 24.

It may be noted that the length of the bow portion 6 need not exceed one-fourth, and preferably one-fifth, of the length of the transport and that the depth of each of the side rails 7 and 8 should not exceed one-fifth of the beam of the transport. The distance from the plane of the lower edges of the side rails and the plane of the bottom plating 15 may be approximately one-half of the depth of the side rails and in transports of reasonable size, such distance may vary from about 1½ to 3½ or 4 feet.

The lower surface of the hull deck portion 1 preferably includes a stern area and a bow area, the stern area being at a lower level than the bow area. The plating 15 illustrated in Fig. 4 acts as the bow area of the lower surface of the hull deck portion. Fig. 5 (which is a continuation in effect of the section shown in Fig. 4) illustrates the aft portion of the transport and it will be noted that the plate 15' is at a lower level than the plate 15.

It is also to be noted that the side rails are of greater depth in the stern portion and that the transition in depth of side rails is gradual, including the rearwardly and downwardly inclined lower edge portion 27 (Fig. 1). This transition from bow to stern deck areas may occur at any desired point in the length of the transport and its precise location will depend somewhat upon the total length of the transport, the load to be carried thereby and the speeds at which the transport is to operate in actual practice. Generally stated, the transitional zone may occur at a point falling within the range 30% to 65% of the total length of the transport measuring from the bow thereof. In some instances it has been found highly desirable to incline a portion of the bow area of the lower surface of the hull deck in a downwardly and rearwardly inclined direction so as to substantially merge the two areas one into the other and to separate the two areas by means of a transverse baffle or plane which extends downwardly and rearwardly below the level of the stern surface area of the bottom of the hull deck. Such rearwardly and downwardly inclined baffle or partition is indicated at 28 and it will be noted that the trailing edge of such partition 28 is spaced from and extends below the aft area 15'.

Figure 9:
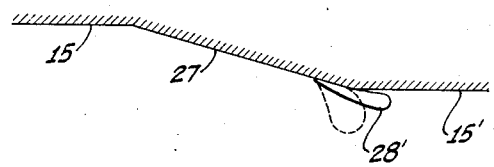
Fig. 9 is a portion of the hull, in longitudinal section, showing a modified form of baffling means.

The baffle 28 may be adjustably positionable so as to change its inclination and increase or decrease the space between the trailing edge thereof and the level of the aft surface area 15'. Instead of employing a substantially rigid but adjustable baffle 28, an inflatable member 28' may be employed, as shown in Fig. 9, the amount of pressure supplied to the inflatable member 28' determining the depth to which it will extend beneath the surface of the stern plating 15'. The position of the baffle 28' when fully inflated is shown in dotted lines.

The transport is provided with suitable blowers or air compressors which may be of the centrifugal, reciprocating or rotary type. These blowers or compressors are suitably driven and means are provided for supplying compressed air to the space beneath the hull deck such as, for example, the space defined between the bow, stern and side rails and beneath the bottom plating 15 and 15'. In Fig. 4 a conduit 30 is shown leading through the bulkhead 11 and discharging into the lower part of such space. In the event one or more longitudinally extending rails are provided between the side rails 7 and 8, a separate conduit is placed into communication with each space. If, for example, an axial or central rail 12 is employed, then conduits 30 and 30' are used, these conduits supplying compressed air to the spaces beneath the hull deck on either side of the central rail 12. Similarly, suitable conduits are in communication with the aft portions of the space beneath the hull deck such as the space aft of the adjustable partition 28. These various conduits, such as conduits 24, 30, 30' and the like, are provided with suitable check valves and are associated with the discharge outlets of the compressors which are generally indicated at 32.

An air pressure is maintained beneath the bottom plating 15 sufficient to support the transport with the lower edge portions only of the rails in contact with the water. A high pressure is unnecessary. For example, a transport having a length of 300 feet and a beam of 100 feet may present a bottom plating area 15 and 15' of 25,000 square feet so that a pressure of only 4 pounds per square inch maintained within the space beneath the hull deck will adequately support a total load of over 7000 tons. This indicates that the blowers or compressors employed need not have high pressure capacity but should have sufficient capacity to compensate for losses of air from beneath the stern while the transport is moving at high velocity over the surface of a body of water.

By referring to Fig. 1 it will be noted that when the pneumatic transport of this invention is at rest, a water level line is established. As a transport is loaded, the air pressure beneath the plating 15 and 15' and between the side rails is increased, causing the water level beneath the transport and between such rails to be depressed. When the transport is moving, the bow rises slightly, and preferably the bottom of the bow is substantially at water level when the transport is moving at high speed.

Only minor surface areas of the transport, such as the rails, are in contact with the water when the transport is moving, thereby eliminating approximately 80% of the resistance normally encountered by driving a ship through a body of water. The provision of a bow portion which is resiliently yieldable permits the bow to accommodate itself and to yield somewhat to swells, waves and the like and to prevent undue loss of compressed air from beneath the hull deck. Since the bow or buffer here shown is flexible, it does not transmit shocks when waves are hit at high speed. The pressure within the bow portion is preferably higher than beneath the hull planking 15, and may be varied with speed and weather conditions.

In order to further eliminate frictional resistance, the side rails 7 and 8 as well as intermediate rails, such as the central rail 12 may be hollow and provided with a plurality of horizontally spaced small ports arranged near the lower edge areas of such rails. Compressed air may be fed to such rails and permitted to discharge through the small ports, thereby forming a film of air along the surfaces of the side rails, such film of air separating the rails from the water (in large part at least) and thereby still further decreasing frictional resistance.

Attention is also called to the fact that a pneumatic transport constructed in accordance with this invention may carry any desired type of superstructure 2 and that such superstructure may be flat topped and is free from smoke stacks and other objects. As a result the pneumatic transport of the present invention is particularly well adapted for use as an aircraft carrier, presenting a clear, unobstructed runway for planes.

The various air screw means 5, 5' and the like may be mounted upon suitable pedestals and means may be provided for pivoting the motor means and associated air screws about vertical axes, either simultaneously or individually so as to permit proper steering of the transport without the use of rudders in contact with the water.

By changing the angularity of the motor means with respect to the longitudinal axis of the vessel, rapid turns may be obtained. In order to facilitate the access of air to the air screw means, the rear portion of the superstructure 2 may be streamlined, as indicated in Fig. 3. In order to further facilitate steering and balancing of the vessel, extensible planes, such as the planes indicated in Fig. 2 in dotted lines, may be carried by the superstructure, the angle of attack of these planes being adjustably variable so as to increase or decrease the lift on either the port or starboard side and to facilitate rapid turns without undue heeling.

From the description given hereinabove it will be observed that the resulting transport has a very shallow draft and is therefore particularly adapted for use in coastal waters and on rivers, canals, lakes and other shallow waterways. During loading, the air pressure supplied beneath the bottom plating may be regulated in accordance with the disposition and weight of the load so that a higher pressure may be maintained on one side of the center rail than on the other in the event the loading is such as to require this. In substantially all instances, the air pressure within the buffer or bow portion is higher than that maintained between the side rails and beneath the bottom plating. It is to be noted that the stern has substantially complete displacement at all times and that the bow, when the transport is at rest, may also be immersed and have a displacement substantially equal to that of the stern. When the transport is under way, however, and is driven by air screw means positioned at the stern, as shown hereinabove, there is a tendency for the bow to rise very slightly and this rise may be emphasized by the supply of air to beneath the bottom plating so that at full speed the bottom of the flexible bow portion is just in contact with the surface of the water. It is to be understood that air is continuously supplied to the space beneath the transport and that some air may be lost at the stern. The transport, however, does not have a displacement such as generally occurs in ordinary ships. Instead, the air trapped below the bottom plating depresses the water level beneath the transport and therefore the displacement in large part is a displacement caused by air under pressure.

In rough water some air may be lost from beneath the transport either at the bow or stern, but it has been found that such loss occurs only sporadically in rough waters and does not constitute a material loss. It is to be noted, also, that a transport constructed as hereinabove described does not create a rough or large bow wave nor does it set up a wake. As a result, the transport may be moved rapidly along relatively narrow rivers without setting up a wake or bow wave which may endanger the banks of the river, canal or other waterway. The lack of a bow wave also presents loss of air from beneath the transport under the sides of the bow.

Although a bow portion composed of overlapping or interlocked straps of flexible metal has been disclosed, it is to be understood that other forms of construction may be employed. For example, corrugated metal may be used to advantage and when available in sufficiently wide bands, need not be overlapped. The use of internal layers of flexible, air-tight materials such as rubberized canvas, composition or the like within the bow portion may be eliminated by the use of a continuous material from which the bow portion is made. Structural details of superstructures form no part of this invention and may be changed as conditions require.

Moreover, although the description given hereinabove has specifically referred to the use of air screw means positioned at the stern, it is understood that additional air screw means may be positioned at the bow. Moreover, the invention is not limited to the use of air screw means since in some cases it may be desirable to employ ordinary propellers extending through the stern and immersed in the water.

All changes, modifications, adaptations and uses coming within the scope of the appended claims are embraced thereby.

I claim:

1. A transport vessel adapted for use on water, comprising: a substantially horizontal hull deck portion of substantially rectangular plan; downwardly directed, longitudinally extending side rail portions carried by the hull deck and extending below the plane of said deck; a hollow, substantially water-tight bow portion connecting said side rails and hull deck and including a transverse bulkhead connecting said side rails and deck, and a plurality of flexible metallic strips in adjacent and overlapping relation extending downwardly and rearwardly from the bow of the hull deck, the rear and lower edges of said strips being connected to the bottom portion of the transverse bulkhead to form a substantially water-tight bow portion; and a stern connecting the side rails and hull deck and extending to substantially the lower edge portions of the side rails to form an enclosed space beneath said hull deck.

2. A transport vessel adapted for use on water, comprising: a substantially horizontal hull deck portion of substantially rectangular plan; downwardly directed, longitudinally extending side rail portions carried by the hull deck and extending below the plane of said deck; a hollow, substantially water-tight bow portion connecting said side rails and hull deck and including a transverse bulkhead connecting said side rails and deck, and a plurality of flexible metallic strips in adjacent and overlapping relation extending downwardly and rearwardly from the bow of the hull deck, the rear and lower edges of said strips being connected to the bottom portion of the transverse bulkhead to form a substantially water-tight bow portion; a stern connecting the side rails and hull deck and extending to substantially the lower edge portions of the side rails to form an enclosed space beneath said hull deck; and means carried by the transport and in communication with the said space for supplying compressed air thereto.

3. A transport vessel adapted for use on water, comprising: a substantially horizontal hull deck portion of substantially rectangular plan; downwardly directed, longitudinally extending side rail portions carried by the hull deck and extending below the plane of said deck; a hollow, substantially water-tight bow portion connecting said side rails and hull deck and including a transverse bulkhead connecting said side rails and deck, and a plurality of flexible metallic strips in adjacent and overlapping relation extending downwardly and rearwardly from the bow of the hull deck, the rear and lower edges of said strips being connected to the bottom portion of the transverse bulkhead to form a substantially water-tight bow portion; a stern connecting the side rails and hull deck and extending to substantially the lower edge portions of the side rails to form an enclosed space beneath said hull deck; means carried by the transport and in communication with the said space for supplying compressed air thereto; and a plurality of air screw means mounted on the hull deck at the the stern of the transport.

4. A low draft transport vessel comprising: a substantially horizontal hull deck portion of substantially rectangular plan, downwardly directed, longitudinally extending side rail portions carried by the hull deck and extending below the plane of said deck; a hollow, substantially water-tight bow portion connecting said side rails and hull deck, the lower surface of said bow portion being downwardly and rearwardly curved and resiliently yieldable; a stern connecting the side rails and hull deck and extending to substantially the lower edge portions of the side rails to form a space beneath the hull deck, side rails and bow; and means carried by the transport and in communication with such space for supplying compressed air thereto.

5. A low draft transport vessel comprising: a substantially horizontal hull deck portion of substantially rectangular plan, downwardly directed, longitudinally extending side rail portions carried by the hull deck and extending below the plane of said deck; a hollow, substantially water-tight bow portion connecting said side rails and hull deck, the lower surface of said bow portion being downwardly and rearwardly curved and resiliently yieldable; a stern connecting the side rails and hull deck and extending to substantially the lower edge portions of the side rails to form a space beneath the hull deck, side rails and bow, the lower surface of said hull deck including a stern area and a bow area, the stern area being at a lower level than the bow area; a downwardly and rearwardly extending transverse partition attached to the lower surface of the hull deck and separating said bow and stern areas; and means carried by the transport for controllably supplying compressed air to the space beneath said hull deck and bow and stern surface areas thereof.

6. In a transport vessel of the character defined in claim 4, the provision of a plurality of air screw means mounted on the hull deck at the stern of the transport.

7. In a transport of the character defined in claim 5, the provision of a plurality of air screw means mounted on the hull deck at the stern thereof.

8. A low draft transport vessel comprising: a substantially horizontal hull deck portion of substantially rectangular plan provided with downwardly directed, longitudinally extending side rail portions, the depth of each of said side rails not exceeding one-fifth of the beam of said transport; a hollow, substantially air-tight bow portion connecting said side rails and hull deck and terminating at a transverse bulkhead carried by the lower portion of said hull deck and connecting said side rails, the length of said bow portion not exceeding one-fourth of the length of the transport; a stern connecting the side rails and hull deck and extending to substantially the lower edge portions of the side rails; and means carried by the transport and in communication with the space beneath the hull deck and between said rails, bow and stern portions for supplying compressed air to said space.

9. A low draft transport vessel comprising: a substantially horizontal hull deck portion of substantially rectangular plan provided with downwardly directed, longitudinally extending side rail portions, the depth of each of said side rails not exceeding one-fifth of the beam of said transport; a hollow, substantially air-tight bow portion connecting said side rails and hull deck and terminating at a transverse bulkhead carried by the lower portion of said hull deck and connecting said side rails, the length of said bow portion not exceeding one-fourth of the length of the transport, the aft portions of said side rails being of greater depth than the bow portions; a stern connecting the side rails and hull deck and extending to substantially the lower edge portions of the side rails; and means carried by the transport and in communication with the space beneath the hull deck and between said rails, bow and stern portions for supplying compressed air to said space.

10. A transport of the character defined in claim 9 wherein the side rails are hollow and are provided with a plurality of horizontally spaced, small ports in the walls thereof adjacent the lower edges of said rails; and means carried by the transport for controllably supplying compressed air to said side rails.

CHARLES C. CRISTADORO.